United States Patent
Hanses et al.

(10) Patent No.: US 9,491,034 B1
(45) Date of Patent: Nov. 8, 2016

(54) SYSTEM AND METHOD FOR WEB SERVICES DELIVERY

(75) Inventors: Philip C. Hanses, East Lansing, MI (US); Balaji Prasad, Troy, MI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1875 days.

(21) Appl. No.: 10/815,548

(22) Filed: Apr. 1, 2004

(51) Int. Cl.
*G06F 15/16* (2006.01)
*H04L 29/08* (2006.01)

(52) U.S. Cl.
CPC ................ *H04L 29/08558* (2013.01)

(58) Field of Classification Search
CPC ........... H04L 29/08558; H04L 69/329; H04L 29/08945
USPC ........................................ 709/230, 200, 203
See application file for complete search history.

(56) References Cited

U.S. PATENT DOCUMENTS

| | | | |
|---|---|---|---|
| 6,430,624 B1 * | 8/2002 | Jamtgaard et al. | 709/246 |
| 6,735,771 B1 | 5/2004 | Houlding | |
| 7,127,700 B2 * | 10/2006 | Large | 717/100 |
| 7,159,224 B2 * | 1/2007 | Sharma et al. | 719/310 |
| 2002/0069157 A1 * | 6/2002 | Jordan | G06Q 30/08 705/37 |
| 2003/0078960 A1 * | 4/2003 | Murren et al. | 709/203 |
| 2003/0204612 A1 * | 10/2003 | Warren | 709/230 |
| 2004/0030627 A1 * | 2/2004 | Sedukhin | 705/36 |
| 2004/0221001 A1 * | 11/2004 | Anagol-Subbarao et al. | 709/203 |
| 2007/0204279 A1 * | 8/2007 | Warshavsky et al. | 719/330 |

* cited by examiner

*Primary Examiner* — El Hadji Sall
(74) *Attorney, Agent, or Firm* — Hewlett Packard Enterprise Patent Department

(57) ABSTRACT

A system and method for allowing dynamic business oriented systems to execute in multiple run-time environments and on multiple computing platforms. This embodiment is an Enterprise Framework developed to Java 2 Enterprise Edition (J2EE) specifications and Web Services specifications but with additional layering of services that isolate the framework from the J2EE implementation and the evolving Web Services specification. This layering of services enables implementation of the framework by technologies other than J2EE or Web Services. The layering also eliminates the mandate that a Web Service has to be XML-based thus allow for a more open and flexible implementation of Non-XML based services.

14 Claims, 3 Drawing Sheets

SYSTEM AND METHOD FOR WEB SERVICES DELIVERY

TECHNICAL FIELD OF THE INVENTION

The present invention is directed, in general, to data processing services and systems.

BACKGROUND OF THE INVENTION

Increasingly, both individual and corporate computer users are turning to "web services." One accepted definition of web services is provided by, Microsoft Corporation: "A Web Service is programmable application logic accessible using standard Internet protocols. Web services combine the best aspects of component-based development and the Web. Like components, Web services represent black-box functionality that can be reused without worrying about how the service is implemented. Unlike current component technologies, Web services are not accessed via object-model-specific protocols, such as the distributed Component Object Model (DCOM), Remote Method Invocation (RMI), or Internet Inter-ORB Protocol (IIOP). Instead, Web services are accessed via ubiquitous Web protocols and data formats, such as Hypertext Transfer Protocol (HTTP) and Extensible Markup Language (XML). Furthermore, a Web Service interface is defined strictly in terms of the messages the Web Service accepts and generates. Consumers of the Web Service can be implemented on any platform in any programming language, as long as they can create and consume the messages defined for the Web Service interface."

Moving into a web services paradigm presents many challenges to the service provider. The following are some of the technical and business challenges presented by the age of electronic business: technology changes and evolution; proprietary execution environments and platforms; difficulties in building global systems while conforming to local customs, human factors, business practices, regulations, and laws; introduction of new business processes and services; changing business processes and services; and varied business processes for different parts of the enterprise.

Other challenges include disparate business processes and services with in an enterprise; disparate business processes and services between corporations; varied business system flow or navigation for different parts of the enterprise; designing a portfolio of business processes to choose from, some of which serve a similar purpose; multiple user devices; and lack of consistency in systems implementation.

Traditional responses to this problem often provide short-term solutions but tend to compound the problem in the long-term. There is, therefore, a need in the art for an improved system, method, and framework for delivering web services.

SUMMARY OF THE INVENTION

A preferred embodiment provides a system and method for allowing dynamic business oriented systems to execute in multiple run-time environments and on multiple computing platforms. This embodiment is an Enterprise Framework developed to Java 2 Enterprise Edition (J2EE) specifications and Web Services specifications but with additional layering of services that isolate the framework from the J2EE implementation and the evolving Web Services specification. This layering of services enables implementation of the framework by technologies other than J2EE or Web Services. The layering also eliminates the mandate that a Web Service has to be XML-based thus allow for a more open and flexible implementation of Non-XML based services.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
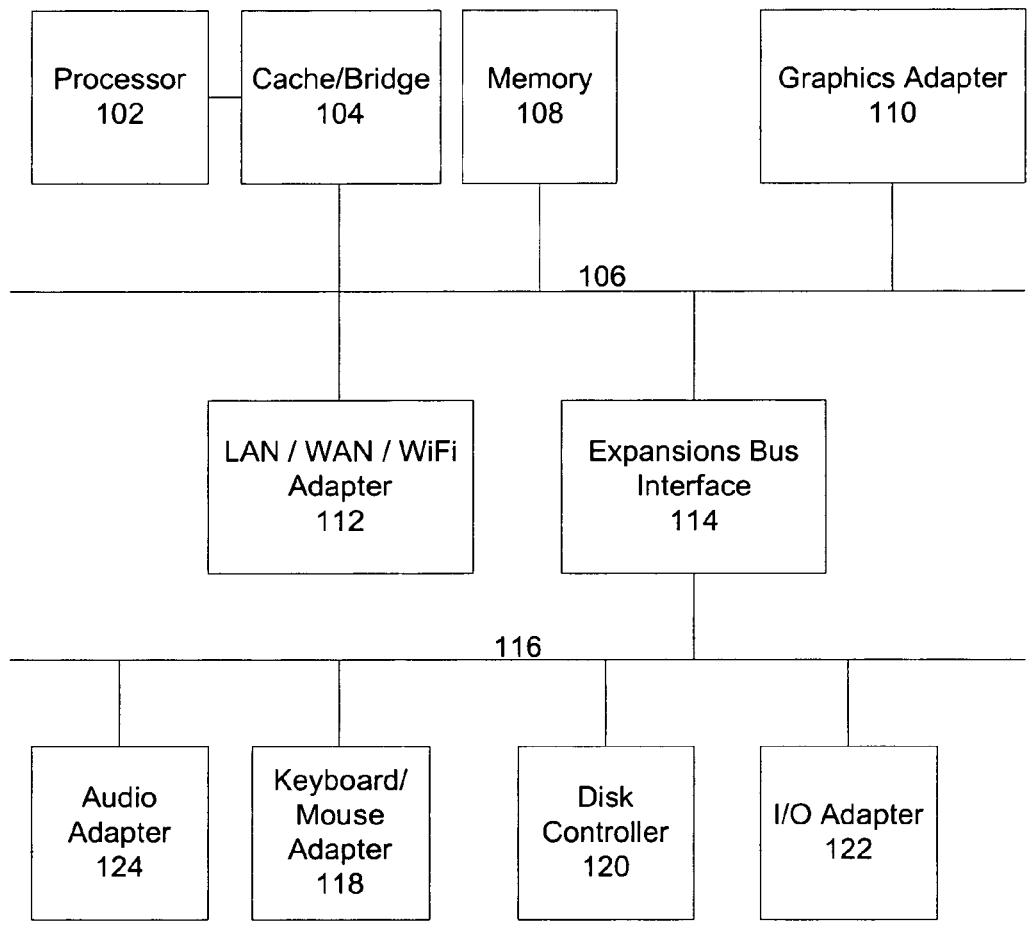
FIG. 1 depicts a block diagram of a data processing system in which an embodiment of the present invention can be implemented.
Figure 2:
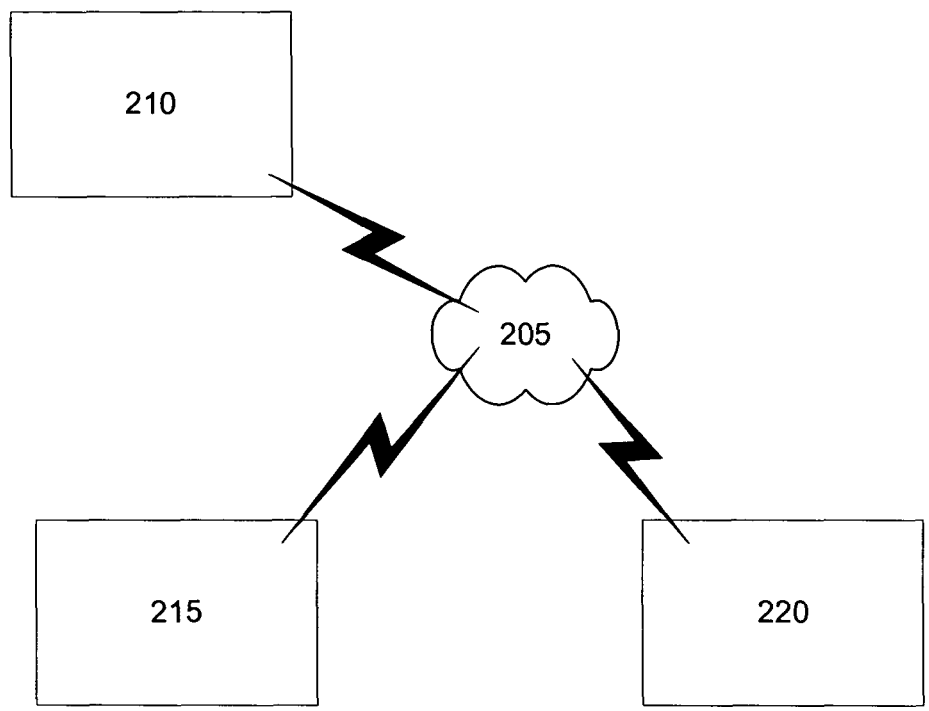
FIG. 2 depicts a block diagram of a data processing system network in which an embodiment of the present invention can be implemented.
Figure 3:
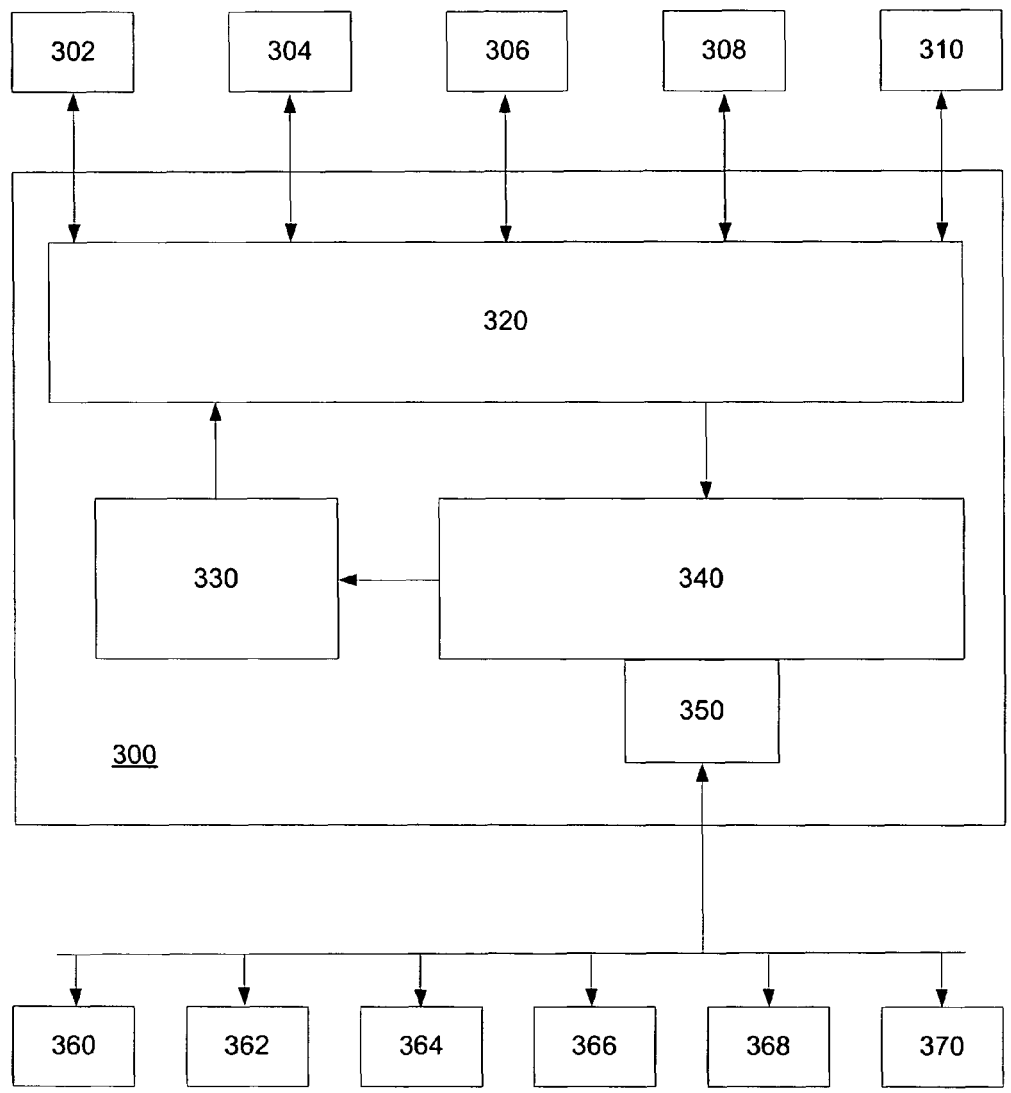
FIG. 3 depicts a functional block diagram of a webs services interaction framework in accordance with a preferred embodiment.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

FIG. 1 depicts a block diagram of a data processing system in which a preferred embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described.

Further, the system of FIG. 1 includes means for sending and receiving information via the internet, using standard web software.

FIG. 2 depicts a block diagram of a data processing system network in which an embodiment of the present invention can be implemented. In this figure, network 205 is any known type of computer network, including private networks or public networks such as the Internet. While network 205 is shown in only one instance here; as known to those of skill in the art, network 205 can be implemented in multiple separate networks, or in the same public or private network system. Of course, any data or network communication described herein can be implemented using any known data communications means, such as via telephone modem, xDSL, fiber optic, wireless, etc., or public or private networks. These communications will include data pertaining to purchases and refunds, taxes, and other functions, as known in the art and/or as specifically described below.

Server 210 is shown communicating client systems 215/220 via network 205. Server system 210 is a data processing system server, configured to communicate with multiple different client systems, including client systems 215/220 and others.

It is understood that client systems 215/220 and server system 210 may be co-located or placed at different locations, or be otherwise structured as known to those of skill in the art, so long as they are capable of together performing the functions described and claimed herein.

The communications between systems can be made in any known fashion, and in one embodiment, utilize standard markup-language communications, as known to those of skill in the art.

A preferred embodiment provides a system and method for allowing dynamic business oriented systems to execute in multiple run-time environments and on multiple computing platforms. This embodiment is an Enterprise Framework developed to Java 2 Enterprise Edition (J2EE) specifications and Web Services specifications but with additional layering of services that isolate the framework from the J2EE implementation and the evolving Web Services specification. This layering of services enables implementation of the framework by technologies other than J2EE or Web Services. The layering also eliminates the mandate that a Web Service has to be XML-based thus allow for a more open and flexible implementation of Non-XML based services.

FIG. 3 depicts a functional block diagram of a webs services interaction framework 300 in accordance with a preferred embodiment. Particular features of the disclosed framework, as shown in FIG. 3, include:

A Web Services Protocol abstraction layer 320 that separates the underlying technology implementation from the invoking client's (requestors) protocol, the business processes that are requested and or Web Services. This Abstraction Layer provides the benefit of facilitating the conversation between the protocol of the client (requester) and the conversion to a common protocol for interacting with business process and or Web Services, of isolating technology evolution, protocol changes and changes from in business processes or Web Services. The Web Services Protocol abstraction layer provides interaction between various clients and desired services in a request-response mode of conversation and in a subscriber publisher mode of conversation. These clients include but are not limited to Mark-up Language Clients (HTML,XHMTL) 302, Wireless Clients 304, SOAP Clients 306, XML-RPC Clients 308, and other Clients 310 and may include natural language and machine language interaction. Additionally the Web Services Protocol abstraction layer facilitates a subscriber-publisher mode of conversation by converting a published message from a business process and or Web service utilizing the common protocol of the Web Services Protocol abstraction layer to the protocol of the client (subscriber). The Web Services Protocol abstraction layer then publishes to the client (subscriber) utilizing the protocol of the client. These clients include but are not limited to Mark-up Language Clients (HTML, XHMTL) 302, Wireless Clients 304, SOAP Clients 306, XML-RPC Clients 308, and other Clients 310.

A Web Services Interaction manager abstraction layer 340 that manages the coordination, interaction and linking of services. The Interaction manager manages the linking of disparate services together to complete a request or to produce a publication. These services may be in the form of formal "Web Services" that are strictly implemented through XML as specified by the formal Web Services specifications and utilizing the Web Services Description Language (WSDL) and the Universal Description, Discovery and Integration (UDDI). Alternately, the services can be service implementations including but not limited to Java Classes, Java Beans or Enterprise Java Beans. The Interaction manager manages the interaction whether a service is invoked synchronously or asynchronously. Additionally, the Web Services InterAction Manager Abstraction Layer will capture and record statistical use and metrics associated with the services being invoked including the user/requestor/recipient and other information associated with the use of a service.

A Services Discovery layer 350 that will abstract and isolate the discovery mechanisms provided by the Web Services standard (WSDL, UDDI) while providing discovery for non-Web Services specific services. The Services Discover layer provides the means for registering services and the method and interaction of requesting services. These non-Web Services include but are not limited to EJB look ups 364, Java Bean business objects 366, Java Classes 368. Web services communicating with services discovery layer 350 include web services/SOAP 360, web services XML-RPC 362. Further, services discovery layer 350 also communicates with other business logic or services 370.

A Service binding layer 330 that allows the output of an invoked Web Service to be presented in multiple formats including but not limited to HTML, SOAP, XML, XML/XSL, JSP and other formats used by human or business process and or Web Services. The Service binding layer allows a request received via one device/protocol/invocation to be bound to a different device/protocol/invocation or to multiple devices/protocols/invocations. The binding to from the requestor to the responding device/protocol/invocation is configurable and dynamic based on the conversation.

The preferred embodiment removes the developers from coding and using the low level J2EE components and Web Services specifications.

The preferred embodiment further provides documented, predefined methods and classes for developers to use to interact with lower level services. Many lower level APIs for J2EE and Web Services are widely published in the industry. Further, in accordance with some embodiments, developers are able to provide predefined methods, classes and invocations that allow specific systems to interact and invoke the framework, using techniques known to those of skill in the art.

Also, the disclosed system isolates the business process or Web Service from evolving standards. As the Web Services standards evolve and change, the isolation minimizes the effects on the invoked business processes or the Web Service.

Dynamic Web Services and business process flows allow Web Services and or business processes to be linked together to provide for easy introduction of new, Web Services or business process, or for changes to the existing Web Services or business processes.

The preferred embodiment is developed to J2EE specifications thereby minimizing the impact of proprietary execution environments and platforms.

The above distinctions provide advantages over other frameworks that are API focused, defined as "tool" frameworks, or XML or SOAP specific implementations.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A server data processing system comprising a processor and a memory, wherein the server data processing system is connected to communicate with a plurality of clients over a data processing system network,
   wherein the server data processing system is to implement a web-services delivery framework, the web-services delivery framework including:
   a protocol abstraction layer to provide interaction between one of the plurality of clients and web services, and to convert a request from the client in a first protocol to a common protocol for interacting with the web services;
   a service binding layer to interact with the protocol abstraction layer to allow output of invoked web services to be presented in multiple formats and to bind the request received via the first protocol used by the client to different protocols used by the invoked web services; and
   an interaction manager abstraction layer to interact with the protocol abstraction layer and the service binding layer and to link disparate web services together to complete the request from the client.

2. The server data processing system of claim 1, wherein the interaction manager abstraction layer includes a services discovery layer to provide discovery for non-web services of the services.

3. The server data processing system of claim 1, wherein the interaction manager abstraction layer includes a services discovery layer to register services and provide an interaction for requesting services.

4. The server data processing system of claim 1, wherein the protocol abstraction layer provides interaction between the plurality of clients and the web services in a request-response mode of conversation and in a subscriber-publisher mode of conversation.

5. The server data processing system of claim 1, wherein the clients include Mark-up Language Clients, Wireless Clients, SOAP Clients, and XML-RPC Clients.

6. The server data processing system of claim 1, wherein the interaction manager abstraction layer is to manage the linking of the disparate services to produce a publication.

7. The server data processing system of claim 1, wherein the interaction manager abstraction layer is to capture and record statistical use and metrics.

8. A non-transitory computer readable medium storing machine readable instructions executable by a processor in a server data processing system, wherein the server data processing system includes a protocol abstraction layer, a service binding layer, and an interaction manager abstraction layer, and when executed the machine readable instructions are to cause the server data processing system to:
 convert, at the protocol abstraction layer, a request from a client in a first protocol to a common protocol for invoking web services;
 bind, at the service binding layer, the request received via the first protocol used by the client to different protocols used by the invoked web services;
 allow, by the service binding layer, output of the invoked web services to be presented in multiple formats; and
 link, at the interaction manager abstraction layer, disparate web services together to complete the request from the client.

9. The non-transitory computer readable medium of claim 8, wherein the machine readable instructions further cause the server data processing system to discover, at a services discovery layer, non-web services.

10. The non-transitory computer readable medium of claim 9, wherein the machine readable instructions further cause the server data processing system to capture and record statistical use and metrics.

11. The non-transitory computer readable medium of claim 10, wherein the machine readable instructions further cause the protocol abstraction layer to provide interaction between the client and the web services in a request-response mode of conversation and in a subscriber-publisher mode of conversation.

12. A method for a server data processing system to communicate with a plurality of clients, wherein the server data processing system includes a protocol abstraction layer, a service binding layer, and an interaction manager abstraction layer, the method comprising:
 converting, by a processor of the server data processing system, a request from one of the clients in a first protocol to a common protocol for invoking web services;
 binding, by the processor of the server data processing system, the request received via the first protocol used by the client to different protocols used by the invoked web services;
 allowing, by the processor of the server data processing system, output of the invoked web services to be presented in multiple formats; and
 linking, by the processor of the server data processing system, disparate web services together to complete the request from the client.

13. The method of claim 12, further comprising:
 discovering, by the processor of the server data processing system, non-web services.

14. The method of claim 13, further comprising:
 capturing and recording, by the processor of the server data processing system, statistical use and metrics.

* * * * *